US012305836B2

(12) United States Patent
Quadri et al.

(10) Patent No.: US 12,305,836 B2
(45) Date of Patent: May 20, 2025

(54) LIGHT FIXTURE, IN PARTICULAR A LIGHT FIXTURE FOR STAGE

(71) Applicant: CLAY PAKY S.R.L., Seriate (IT)

(72) Inventors: Aris Quadri, Seriate (IT); Davide Ferrati, Brembate (IT); Alberto Alfier, Vedelago (IT)

(73) Assignee: CLAY PAKY S.R.L., Seriate (IT)

( * ) Notice: Subject to any disclaimer, the term of this patent is extended or adjusted under 35 U.S.C. 154(b) by 0 days.

(21) Appl. No.: 18/640,176

(22) Filed: Apr. 19, 2024

(65) Prior Publication Data

US 2024/0353088 A1 Oct. 24, 2024

(30) Foreign Application Priority Data

Apr. 24, 2023 (IT) ........................ 102023000008043

(51) Int. Cl.

*F21V 21/15* (2006.01)
*F21V 21/30* (2006.01)
*F21W 131/406* (2006.01)

(52) U.S. Cl.

CPC .............. *F21V 21/15* (2013.01); *F21V 21/30* (2013.01); *F21W 2131/406* (2013.01)

(58) Field of Classification Search

CPC .... F21V 21/15; F21V 21/30; F21W 2131/406
USPC ........................................................ 362/249.1
See application file for complete search history.

(56) References Cited

U.S. PATENT DOCUMENTS

| | | | | |
|---|---|---|---|---|
| 2,097,537 | A | 11/1937 | Earl | |
| 3,644,728 | A | 2/1972 | Hessemer et al. | |
| 2004/0165385 | A1 | 8/2004 | Belliveau | |
| 2021/0199273 | A1 * | 7/2021 | Jurik | F21V 23/003 |

FOREIGN PATENT DOCUMENTS

| | | | |
|---|---|---|---|
| EP | 3789669 | A1 | 3/2021 |
| EP | 3816506 | A1 | 5/2021 |
| EP | 3964750 | A1 | 3/2022 |

OTHER PUBLICATIONS

Italian Search Report in IT Application No. 202300008043 mailed Oct. 18, 2023, an English Translation attached hereto (7 pages).

* cited by examiner

*Primary Examiner* — Elmito Breval
*Assistant Examiner* — Hana S Featherly
(74) *Attorney, Agent, or Firm* — Leason Ellis LLP

(57) ABSTRACT

A light fixture, in particular a light fixture for a stage; wherein the light fixture comprises: a support comprising a base and a fork with two arms, wherein the fork is coupled to the base in a rotating manner around a first axis; a head housing at least one lighting device and coupled to the arms of the fork in a rotating manner around a second axis; a first and a second motor powered by electricity to respectively drive the rotation of the fork relative to the base around the first axis and the rotation of the head relative to the fork around the second axis; wherein the light fixture further comprises: at least one braking device configured so that in the absence of a power supply to the first and/or second motor it slows down until stopping the rotation of the fork relative to the base and/or the rotation of the head relative to the fork.

7 Claims, 5 Drawing Sheets

LIGHT FIXTURE, IN PARTICULAR A LIGHT FIXTURE FOR STAGE

CROSS-REFERENCE TO RELATED PATENTS APPLICATIONS

This patent application claims priority from Italian patent application no. 102023000008043 filed on Apr. 24, 2023, the disclosure of which is incorporated herein by reference.

TECHNICAL FIELD

The reference technical field of the present invention refers to light fixtures, in particular light fixture for a stage. Usually, said light fixtures comprise a head, or casing, housing at least one lighting device and the respective electronic apparatus. During use, the head is moved relative to a support by an electric motor. In turn, the support can also comprise portions which, during use, are driven in relative movement by an electric motor. In this technical context, the present invention will address the problem of an unexpected lack of electricity during use of the light fixture and how in this context to preserve the integrity of the moving parts thereof. The solution offered will also be advantageous in other areas such as during transport or in other situations in which the light fixture is not powered by electricity.

STATE OF THE ART

In general, light fixture for a stage, namely, light fixtures configured to generate particular scenic effects, comprise at least one light source configured to generate a light beam and a plurality of light beam processing elements configured to selectively process the light beam according to the scenic needs. The source and processing elements of the light beam are generally housed in a movable casing known as head. To generate the aforementioned particular scenic effects, it is known that the head can rotate around two orthogonal axes, commonly known as PAN and TILT. As known, and as for the purposes of the present invention, these two movements are obtained by providing a support comprising a base and a fork with two arms, wherein the fork is coupled to the base in a rotating manner around a first axis PAN and the head is coupled to the arms of the fork in a rotating manner around a second axis TILT. Said structure is well known to those skilled in the art and therefore for the purposes of a correct understanding of the invention no further details are necessary. To generate the rotations described above, the presence of a first and a second electric motor is provided to control the rotation of the fork relative to the base around the first axis PAN and the rotation of the head relative to the fork around the second axis TILT, respectively.

During the operation of the light fixture, both the head and the fork that supports the same are rotated to obtain the desired lighting and scenic effects; when the light fixture is not in use, the motors responsible for moving the beam processing elements and the casing are not powered. In this case, the movement of the head and fork is out of control, namely it is not driven by the motors, and this can lead to risks of damage in the event that a moving part accidentally collides with an external body. Said risk is particularly high, for example, during stage equipment moving, dismantling, and assembling operations in which the light fixture may be placed in unusual positions and subjected to vibrations and sudden movements. It must also be considered that inside the head the beam processing elements, which are heavier, can spontaneously force the rotation of the head itself.

The problem of uncontrolled movement of the moving parts of the light fixture does not end only when it is not in use. In fact, the possibility of a sudden lack of electricity during use must also be considered. In said situation, in the absence of a power supply the parts moving by their own inertia continue their motion no longer under the control of the motors, thus re-proposing, if not accentuating, the risks described above.

Solutions to said problems are now known wherein the motion of the moving parts of a light fixture is locked both during transport and in the event that the power supply to the motors fails. Although these known solutions are actually able to prevent uncontrolled movements of the head and fork in the absence of a power supply by essentially mechanically locking the motion of said elements so as to avoid collisions with external elements, however these solutions are not optimal in case of a sudden power failure during use. In fact, locking or instantaneous mechanical stopping of the head and fork can transfer kinetic energy to the optical components inside the head in the form of inertia force. Since said components are very delicate, the mechanical stress transmitted to them can damage the same or can lead the heavier components, which due to their greater mass generate greater force, to impact against the lighter ones, damaging the latter. Finally, even during transport, excessive rigidity, due to the fact that the elements are locked together, can lead to damage since a rigid structure, as is known, is not able to dampen the vibrations that may occur.

DESCRIPTION OF THE INVENTION

Starting from said known art, an object of the present invention is to create a light fixture capable of overcoming the drawbacks referred to above in the known art. In particular, the main object of the present invention is to create a device wherein:

- both during transport and during use in the event of a absence of a power supply, uncontrolled movements of the moving parts are avoided;
- during transport the structure is not excessively rigid but is able to absorb by damping any stresses or vibrations that may occur;
- the stopping of the moving parts in the event of a sudden absence of a power supply after a preliminary progressive forced slowing down of the motion of the said parts so as to dissipate the kinetic energy without transmitting excessive stress to the internal components.

Said objects are achieved by improving a light fixture, in particular a light fixture for a stage; of the type comprising:

- a support comprising a base (to be considered fixed, namely to be attached to a fixed external structure) and a fork with two arms, wherein the fork, as known, is coupled to the base in a rotating manner around a first axis PAN (usually vertical);
- a head that houses at least one lighting device and coupled to the arms of the fork in a rotating manner around a second axis TILT, usually said axis is orthogonal to the axis PAN and to the development axis A of the head;
- a first and a second motor powered by electricity to respectively rotate the fork relative to the base around the first axis PAN and rotate the head relative to the fork around the second axis TILT.

In said known structure, according to the main aspect of the present invention the light fixture moreover comprises at least one braking device configured so as to be activated, in the absence of a power supply to the light fixture, so as to slow down until stopping the rotation of the fork relative to the base and/or the rotation of the head relative to the fork. It is possible to provide a single braking device acting on the head relative to the fork, a single braking device acting on the fork relative to the base or two braking devices acting on the head relative to the fork and on the fork relative to the base, respectively. Regardless of the presence of one or two braking devices, on the component on which it acts (head or fork) this device brings the component to stop progressively by slowing it down (the duration of this step will depend on parameters that will be disclosed in the following) so as to dissipate the kinetic energy without transferring excessive stress to the internal optical components. Said device works in the absence of a power supply and therefore also during transport in which, being not a rigid block but a brake, it allows small vibrations that may occur to be absorbed. An auxiliary locking device can be provided in the form of an accessory device further provided in the light fixture.

According to a preferred embodiment of the general principle of the invention described above, the light fixture comprises:

- a first pin along the first axis PAN integral with the fork for the rotation of the fork relative to the base;
- a second pin along the second axis TILT integral with the head for the rotation of the head relative to the fork;

wherein the at least one braking device (acting on the head and/or the fork) is a friction braking device acting on the first and/or second pin so that the kinetic energy is dissipated as heat.

Preferably, the friction braking device acting on the head or on the fork (and on the fork if two braking devices are provided) comprises:

- at least one friction disc (preferably two) made of a material having a high friction coefficient and coupled integrally (or by contact) to the corresponding pin (for example the friction disc can be placed between a corresponding support disc keyed onto the pin and the following braking disc);
- a braking disc (preferably made of metal) coupled by surface contact (or integrally) to at least one friction disc which is centred but not integral with the pin;
- a selective locking device for the braking disc;

wherein the selective locking device is configured to lock the braking disc relative to the corresponding pin in the event of an absence of a power supply so that:

- during the power supply, the braking disc (which in itself would be free relative to the pin) is caused to rotate integrally with the pin by the at least one friction disc due to the friction force;
- in the absence of a power supply, the braking disc is locked by the selective locking device and the at least one friction disc, by sliding on the braking disc, progressively dissipates the kinetic energy by friction, slowing down the corresponding pin until stopping.

The above reference term “disc” is not limited to the circular shape only but can also have other shapes suitable to fulfil the described purposes.

Regarding the material used as a material having a high friction coefficient, the person skilled in the art knows which materials can be used for said purpose, as an example the material known commercially as BREMSKERL 6230 can be used.

According to a preferred embodiment of the selective locking device the following is provided:

- a movable locking arm (preferably sliding) between a first position where a first end does not act against the braking disc and a second position where the first end acts in locking action against the braking disc;
- a spring coupled to a second opposite end of the locking arm configured (preferably by compression) to force the locking arm towards the second position;
- an actuator (preferably a linear solenoid) configured so that:
- during the power supply it holds the spring in compression in a position such that the locking arm is held in the first position; and
- in the absence of a power supply, it releases the locking arm which is pushed by the spring into the second position where it locks the braking disc.

Preferably, the locking of the braking disc due to the locking arm occurs by providing a braking disc in the form of a toothed disc whereas the first end of the locking arm, which acts as a lock against the braking disc, comprises a corresponding toothing.

Preferably, the light fixture can also comprise a manual device for the selective release of the braking device so that even in the absence of a power supply the head and/or fork can be moved manually without effort, namely, without the action of the braking device. Said aspect is useful for returning the light fixture to its rest position at the end of use or after a power failure.

Preferably, the light fixture can further comprise a manual device for the selective mechanical locking of the head and/or fork.

Preferably, the aforementioned manual devices for the selective locking of the head and/or fork and the manual device for the selective release of the braking device (or devices) are integrated into a single manual device selectively switchable between a first position in which the braking device and the head lock are released (free), a second position in which it reloads the braking device and a third position in which it activates the mechanical lock of the head and/or fork.

Preferably, at least one spring is provided between the braking disc, the friction discs and the support discs configured to adjust the preload of the friction braking device. This allows to solve the following problems:

- the braking force is repeatable and not influenced by the assembly operation;
- any thermal expansions are compensated; and
- adequate braking force is guaranteed even following wear of the discs.

LIST OF THE FIGURES

Further characteristics and advantages of the present invention will appear clear from the following description of a non-limiting embodiment thereof, with reference to the figures of the attached drawings, wherein:

FIGS. 1 and 2 schematically show a perspective view and a front view of an example of a light fixture for a stage, respectively;

Figure 3:
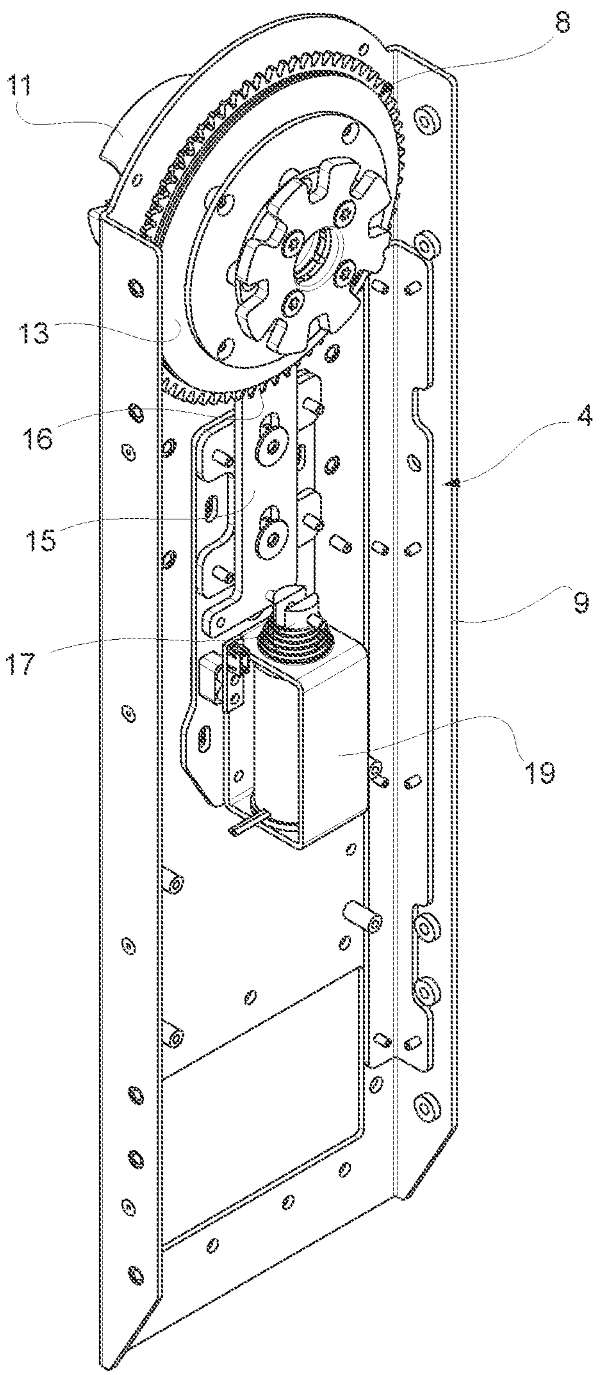
FIG. 3 shows a cutaway view of an element of the light fixture of FIG. 2.
Figure 7:
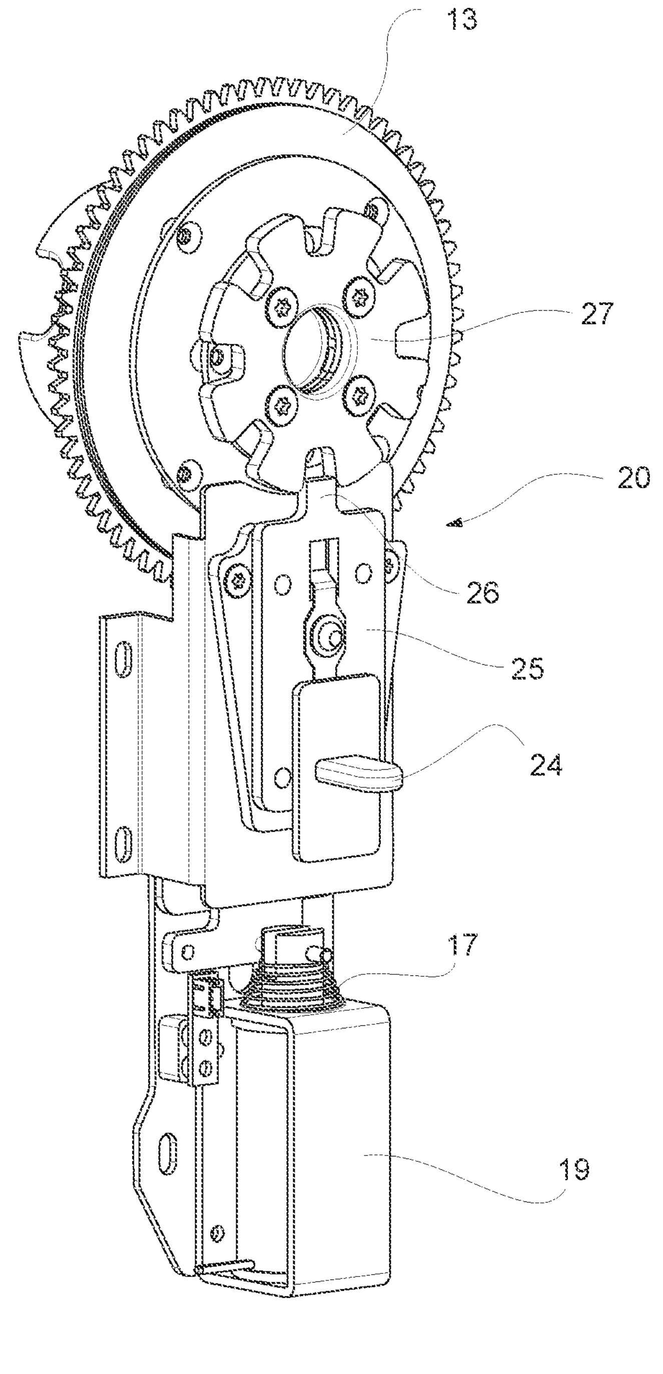

FIG. 7 schematically shows some accessory elements that can be coupled to the element of FIG. 3.

DESCRIPTION OF AN EMBODIMENT OF THE INVENTION

Figure 2:
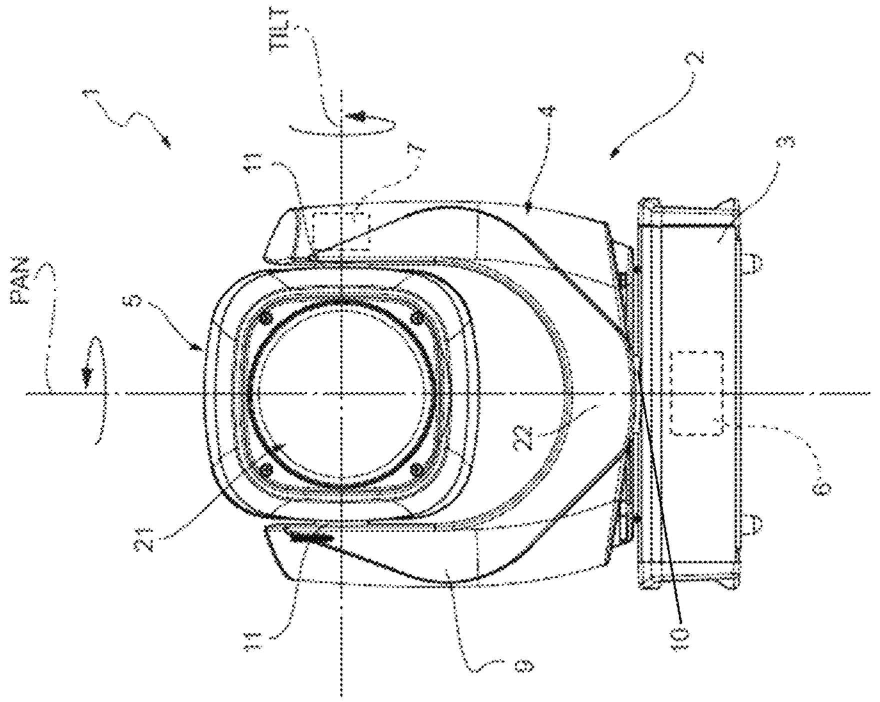
Figure 1:
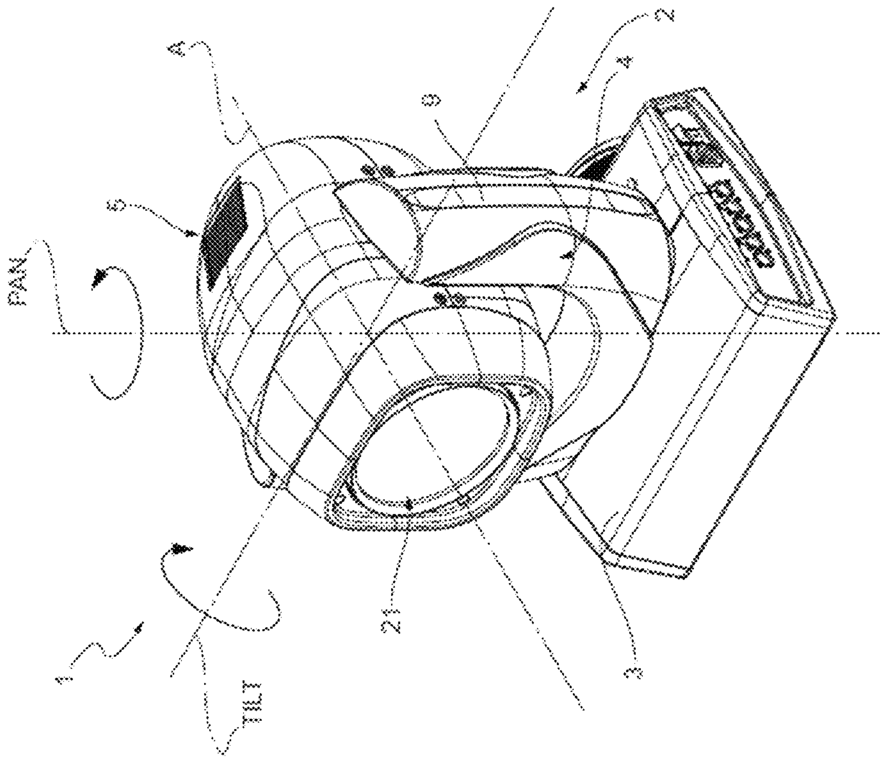

Referring to the attached figures, FIGS. 1 and 2 schematically show a perspective view and a front view of an example of a light fixture for a stage, respectively. Said light fixture 1 comprises:

- a support 2 comprising a base 3 and a fork 4 with two arms 9, wherein the fork 4 is coupled to the base 3 in a rotatable manner around a first axis PAN, the PAN rotation in particular takes place by means of a pin 10 (in this example vertical) integral with the fork 4 which, from its bridge portion 22, penetrates the base 3;
- a head or casing 5 which houses at least one lighting device 21 (as well as a plurality of electronic components) and which is coupled to the arms 9 of the fork 4 in a rotatable manner around a second axis TILT; the TILT rotation in particular takes place by means of pins 11 on the opposite parts of the head along the axis TILT (horizontal in this example) integral with the head 5 which, from its lateral portions, penetrate the arms 9 of the fork 4;
- a first 6 and a second 7 motor, wherein the motors are powered by electricity to respectively drive the rotation of the fork 4 relative to the base 3 around the first axis PAN and the rotation of the head 5 relative to the fork 4 around the second axis TILT. In particular, the first motor 6 sets the pin 10 into rotation (and therefore the fork 4 relative to the base) whereas the second motor 7 sets one of the two pins 11 into rotation (and therefore the head 5 relative to the fork 4).

Said structure is well known to those skilled in the art and therefore no other construction details are necessary to understand the light fixture structure in which, in this example, the invention is implemented.

Figure 4:
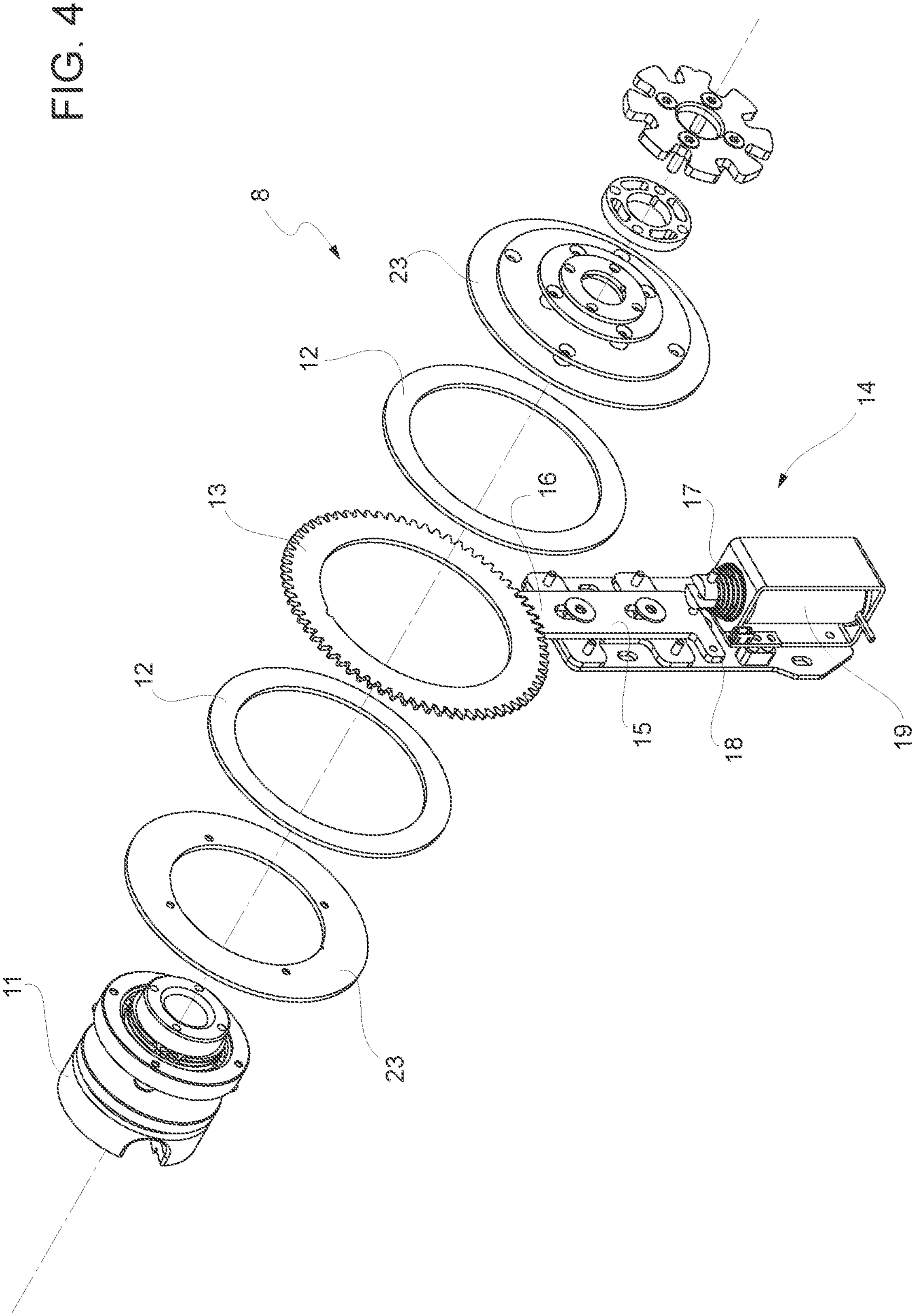
FIG. 4 shows some components of the element of FIG. 3.

FIG. 3 shows an arm 9 of the fork 4 from which some components have been removed to highlight others. In particular, this view shows how according to this example in an arm 9 of the fork 4 a braking device 8 has been arranged acting on a pin 11 and which is configured so that in the absence of a power supply to the first motor 7 (or to the light fixture in general) slows down until the rotation of the head 5 relative to the fork 4 stops. As shown in FIG. 4, this braking device 8 is of the friction type and comprises:

- two friction discs 12 made of a material having a high friction coefficient and supported by support discs 23 integral with the pin 11;
- a braking disc 13 arranged between the friction discs 12 and coupled by contact with the latter in which the braking disc 13 is not integral with the pin 11;
- a selective locking device 14 of the braking disc 13; in which the selective locking device is configured to lock the braking disc 13 relative to the corresponding pin 11 in the absence of a power supply to the motor 7. In this way:
- during the power supply, the braking disc 13 is set into rotation integral with the pin 11 by the friction discs 13;
- in the absence of a power supply, the braking disc 13 is locked and the friction discs 12, by sliding on the braking disc 13 and the support discs 23, generate friction heat which slows down, by dissipating the kinetic energy of the pin 11 until stopping (and along with it, the head 5 relative to the fork 4).

The motor 7 (as well as the motor 6) are shown in FIG. 2 as having direct drive on the rotation pins. However, said motors can also be placed in nearby areas with the aid, for example, of a toothed belt so as to allow a gear reduction of the drive.

Figure 6:
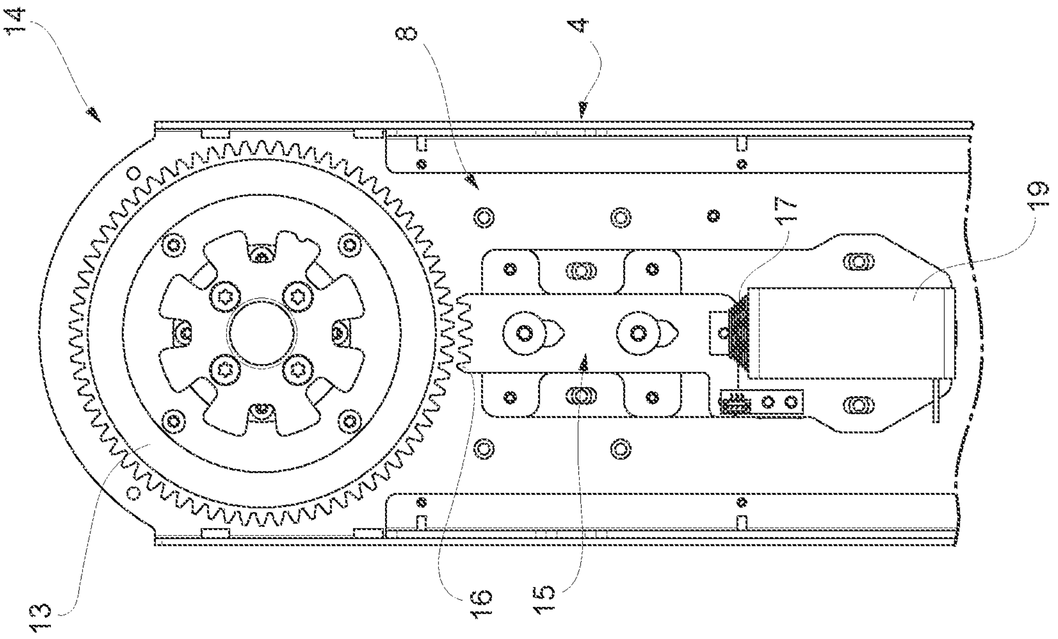
FIGS. 5 and 6 show views of the element of FIG. 3 in two different configurations.
Figure 5:
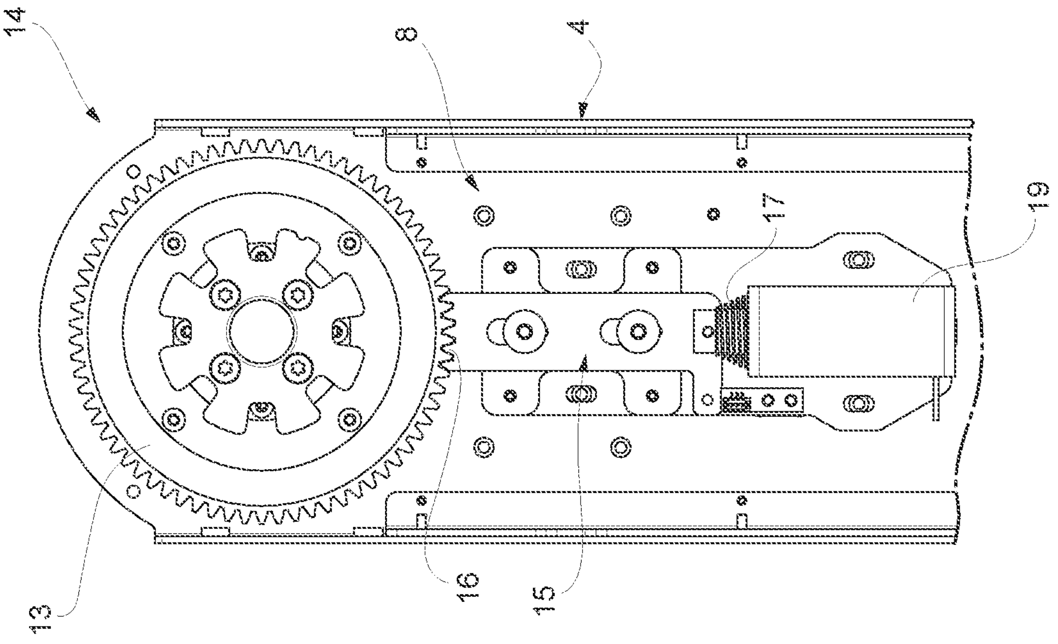

As shown in FIGS. 5 and 6, in this example the selective locking device 14 comprises:

- a locking arm 15 in the form of a movable plate parallel to the arm 9 between a first position where its first end 16 does not act against the braking disc 13 and a second position where the first end 16 acts in locking action against the braking disc 13;
- a spring 17 coupled to the second end 18 of the locking arm 15 configured to force the locking arm 15 towards the second position;
- an actuator 19 in the form of a solenoid configured so that:
- during the power supply, it holds the spring 17 under compression in a position such that the locking arm 15 is in the first position; and
- in the absence of a power supply, releases the spring 17 which pushes the locking arm 15 into the second position.

The plate element can also be made in other shapes, such as a cylindrical pin or a machined block, capable of performing the functions described above.

In this example, the braking disc 13 is a toothed disc and the first end 16 of the locking arm 15 acting to lock against the braking disc 13 comprises a corresponding toothing.

Finally, FIG. 7 shows a second embodiment of the invention wherein in addition to the braking device 8 shown in the previous figures, which as previously described is automatically activated in the absence of a power supply to the light fixture, a manually operated device is provided. In FIG. 7 the reference element 24 represents precisely the point at which the user can intervene to slide the plate 25. By manually moving the plate 25 downwards, the plate 15 of the braking device 8 is also lowered so as to free the rotation of the braking disc 13. In this condition the user can move the head 5 by hand without excessive effort. This possibility is required for example after a power failure wherein the braking device 8 has stopped the head 5 in a non-neutral position (namely substantially the one present at the moment of the power failure) and there is a need to bring the head back 5 in a different position before power is restored. However, by moving the plate 25 upwards, a double effect is produced. The braking device 8 is reloaded (so the friction discs 12 act against the locked braking disc 13) and furthermore a real lock of a mechanical nature is introduced. In fact, the braking device 8 increases the force necessary for the rotation of the head 5 without totally block it. To also prevent this possibility, the upper end 26 of the plate 25 comprises a tooth which is housed in a groove of a toothed wheel 27 integral with the pin 11. In this way the rotation of the pin 11, and therefore of the head 5, is mechanically locked.

It is clear that modifications and alternatives can be made to the invention described herein compared to the example shown in the figures. In fact, the main aspect of the present invention lies in the different mechanism for stopping the mobile components in the absence of a power supply during use. The invention does not provide an instant mechanical lock but a brake that acts progressively. This does not mean that the stopping time is long but that the kinetic energy is absorbed by the sliding braking elements, transforming the same into heat instead of transferring it as inertia to the internal parts of the light fixture.

The invention claimed is:

1. A light fixture, in particular a light fixture for a stage; wherein the light fixture (1) comprises:

a support (2) comprising a base (3) and a fork (4) with two arms (9), wherein the fork (4) is coupled to the base (3) in a rotating manner around a first axis (PAN);

a head (5) housing at least one lighting device (21) and coupled to the arms (9) of the fork (4) in a rotating manner around a second axis (TILT);

a first motor (6) and a second motor (7) powered by electricity to respectively drive the rotation of the fork (4) relative to the base (3) around the first axis (PAN) and the rotation of the head (5) relative to the fork (4) around the second axis (TILT);

characterized in that the light fixture (1) moreover comprises:

at least one braking device (8) configured so that in the absence of a power supply to at least one of the first motor (6) and the second motor (7) slows down until stopping the rotation of at least one of the fork (4) relative to the base (3) and the rotation of the head (5) relative to the fork (4);

wherein the light fixture comprises:

a first pin (10) along the first axis (PAN) integral with the fork (4) for the rotation of the fork (4) relative to the base (3);

a second pin (11) along the second axis (TILT) integral with the head (5) for the rotation of the head (5) relative to the fork (4);

wherein the at least one braking device (8) is a friction braking device acting on at least one of the first (10) and the second pin (11) that can convert the kinetic energy of at least one of the head and the fork into frictional heat;

wherein each friction braking device comprises:

at least one friction disc (12) made of a material having a high friction coefficient and coupled integrally or by contact to the corresponding pin (11);

a braking disc (13) coupled integrally or by contact to at least one friction disc (12) and being separate from the pin (11);

a selective locking device (14) of the braking disc (13); the selective locking device being configured to lock the braking disc (13) relative to the corresponding pin (11) in the absence of a power supply to the corresponding motor (7) so that:

during the power supply, the braking disc (13) is free and set into rotation integral with the pin (11) by at least one friction disc (12);

in the absence of a power supply, the braking disc (13) is locked and the at least one friction disc (12) by sliding on the braking disc (13) or support disc (23) generates a friction force that slows down the corresponding pin (11) until stopping.

2. The light fixture as claimed in claim 1, wherein the selective locking device (14) comprises:

a locking arm (15) movable between a first position where a first end (16) does not act against the braking disc (13) and a second position where the first end (16) acts in locking action against the braking disc (13);

a spring (17) coupled to a second end (18) of the locking arm (15) configured to force the locking arm (15) towards the second position;

an actuator (19) configured so that:

during the power supply, it holds the spring (17) under compression in such a position that the locking arm (15) is in the first position; and in the absence of a power supply, it releases the spring (17) to force the locking arm (15) into the second position.

3. The light fixture as claimed in claim 2, wherein the braking disc (13) is a toothed disc and the first end (16) of the locking arm (15) acting to lock against the braking disc (13) comprises a corresponding toothing.

4. The light fixture as claimed in claim 1, wherein the light fixture (1) additionally comprises a manual device for the selective release of the braking device (8) so that even in the absence of a power supply it is possible to manually move at least one of the head (5) and the fork (4) without the action of the braking device (8).

5. The light fixture as claimed in claim 1, wherein the light fixture further comprises manual selective locking device (20) of at least one of the head (5) and of the fork (4).

6. The light fixture as claimed in claim 5, wherein the manual selective locking device and the manual device for selective release of the braking device are integrated into a single manual device (20) selectively switchable between a first release position of the braking device (8) and a resetting position of the braking device (8) and actuation for locking at least one of the head (5) and the fork (4).

7. The light fixture as claimed in claim 1, wherein at least one spring is provided between the braking disc, the friction discs, and the support discs configured to adjust the preload of the friction braking device.

* * * * *